Sept. 12, 1950          M. W. MORSE          2,521,864
AIRCRAFT LANDING WHEEL PREROTATION MEANS
Filed July 30, 1945          4 Sheets-Sheet 1
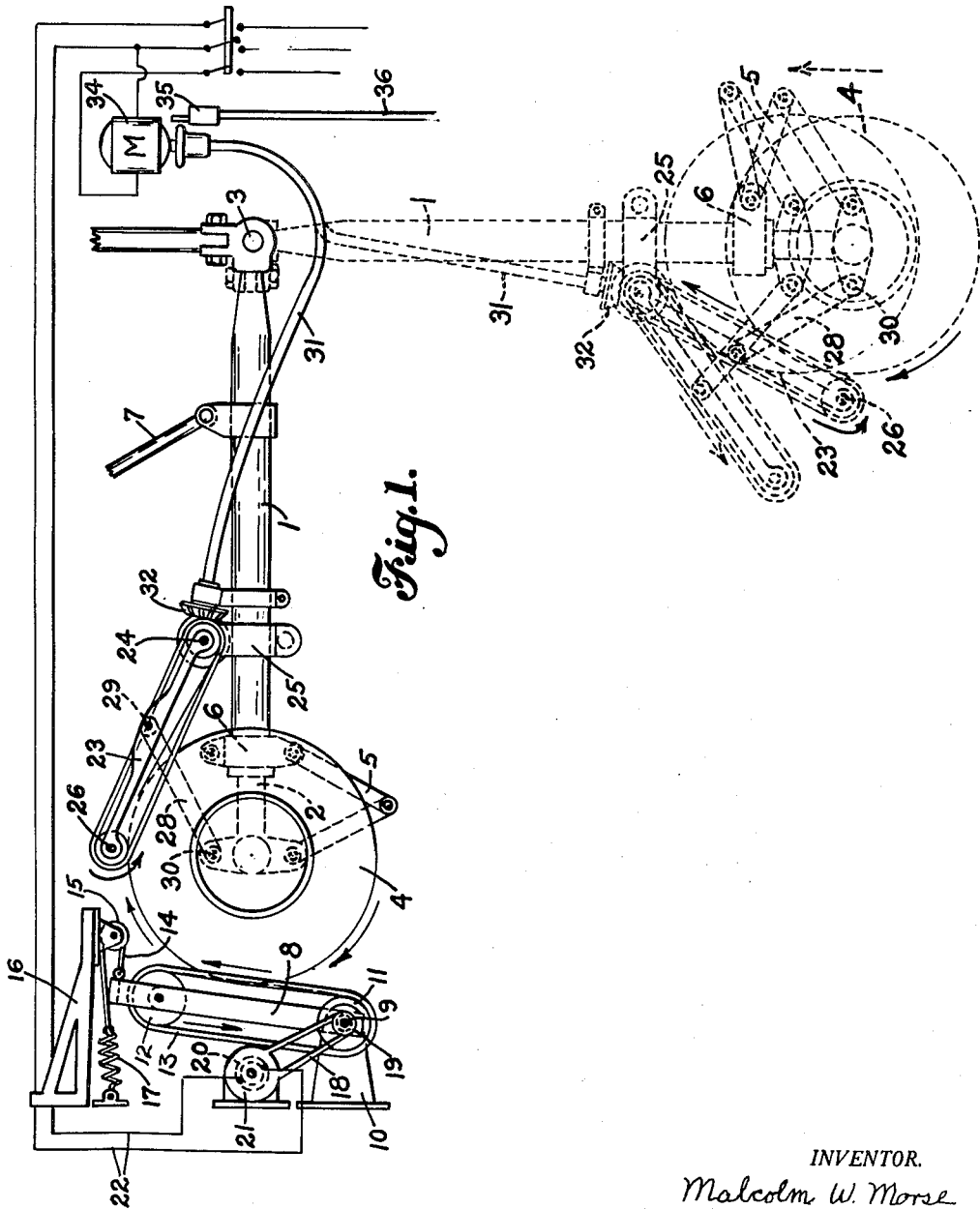
INVENTOR.
Malcolm W. Morse
BY Heard Smith & Tennent
Attorneys

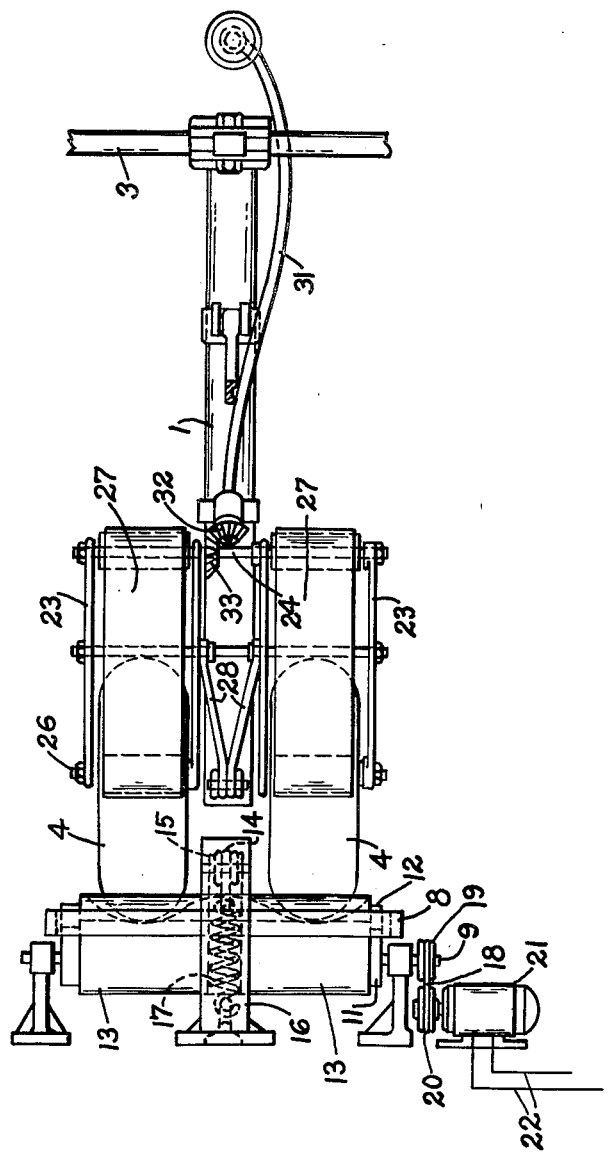

Sept. 12, 1950 M. W. MORSE 2,521,864
AIRCRAFT LANDING WHEEL PREROTATION MEANS
Filed July 30, 1945 4 Sheets-Sheet 3
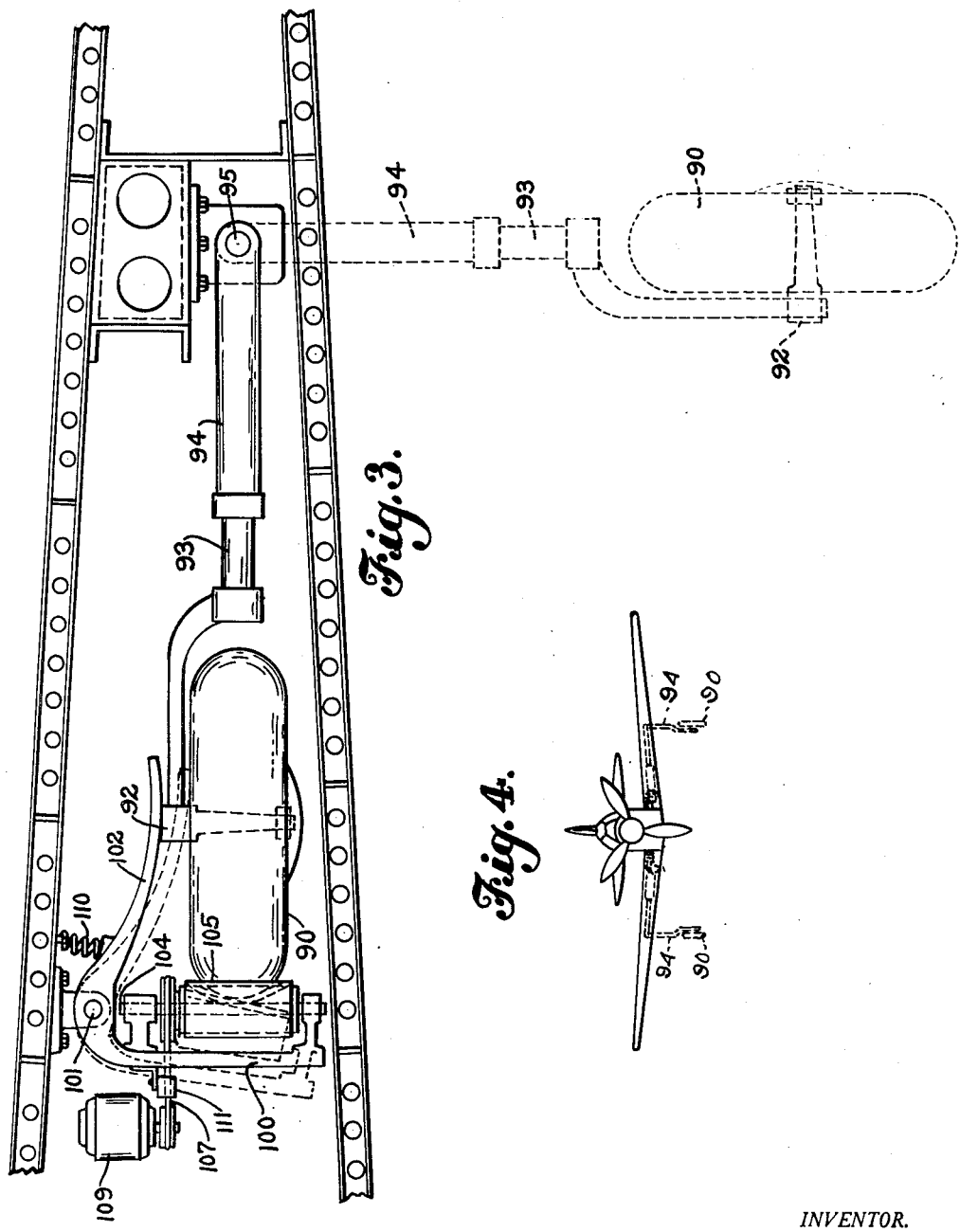
INVENTOR.
Malcolm W. Morse
BY Heard Smith Tennant
Attorneys.

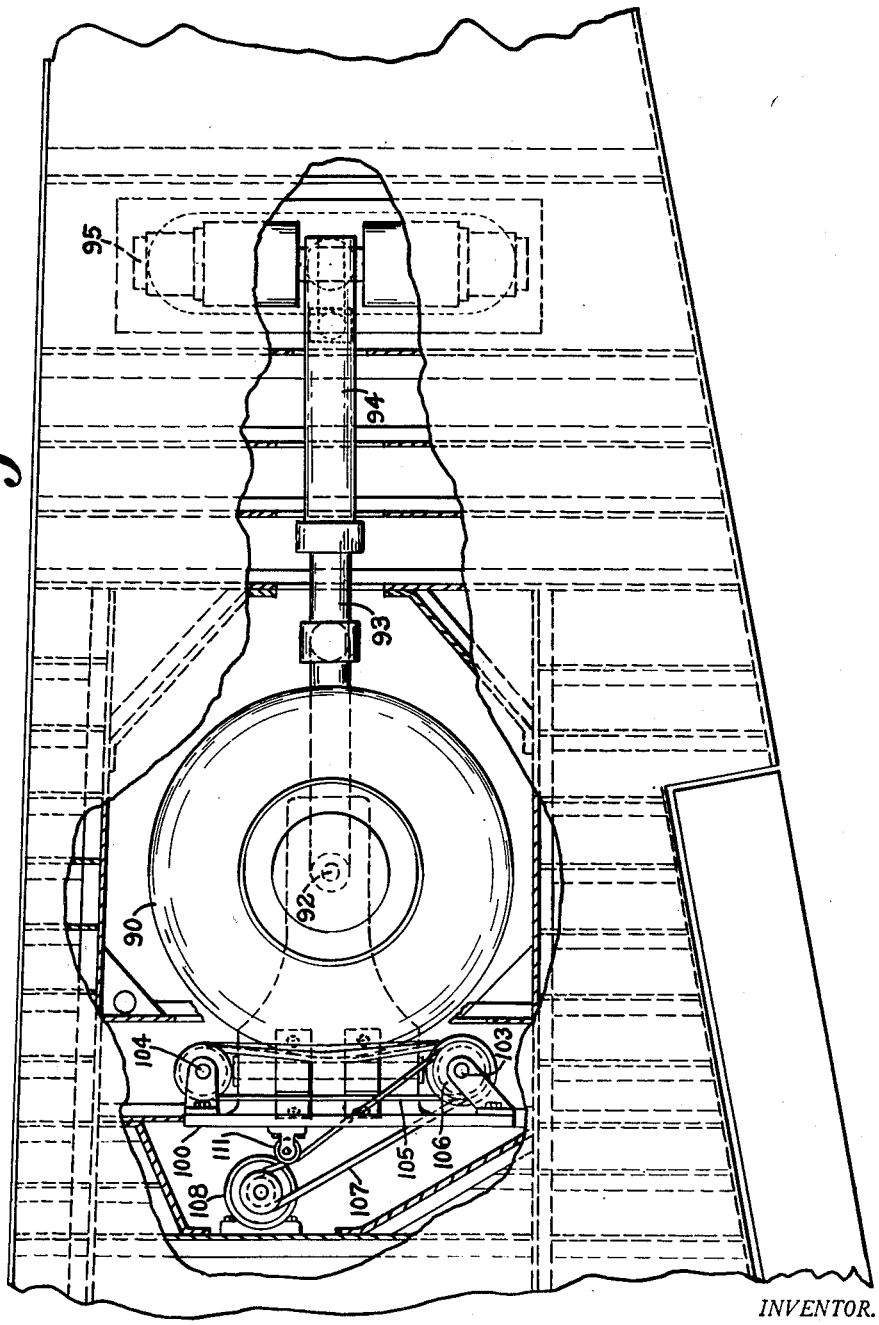

Patented Sept. 12, 1950

2,521,864

UNITED STATES PATENT OFFICE 2,521,864

AIRCRAFT LANDING WHEEL PREROTATION MEANS

Malcolm Wilcox Morse, Wellesley Hills, Mass.

Application July 30, 1945, Serial No. 607,709

10 Claims. (Cl. 244—103)

This invention has for its object to provide novel means for effecting the rotation and controlling the speed of rotation of the landing wheels of aircraft and more particularly for overcoming the inertia of the landing wheels and effecting the prerotation thereof prior to landing to cause the peripheral speed thereof to approximate the ground speed of the aircraft when landing.

Aircraft, as is well known, are provided with landing wheels mounted in various positions and usually retracted during flight and moved to landing position prior to landing. These wheels may be located either beneath the fuselage at the nose, central part, or tail, or beneath the wings, the particular location depending upon the size and type of the aircraft. Each wheel is usually composed of a central drum and a heavy pneumatic tire. The wheels in each location are either single or in pairs. In the case of the large and powerful aircraft, such as the bomber type, these wheels are very large and heavy often weighing a half ton or more apiece. At present bombers, transports, and other large aircraft usually land at a fairly high speed and if the landing wheels are motionless in the retracted position and not rotating before being lowered preparatory to landing so as to have a peripheral speed approximating the ground speed of the aircraft when the landing takes place or at the instant of contact of the ground, there results extreme stress and wear upon the tires of the wheels due to the drag of the wheels while under the heavy load on the surface of the ground.

In the present invention driving means are provided which operate directly upon the peripheries of the landing wheels so that the power to effect prerotation is applied in the most efficient manner. Furthermore, in order to overcome the inertia to prerotation, the driving means are preferably operated at a variable or gradually accelerated speed until the prerequisite speed is obtained.

The invention also has for its further object to provide various novel means for effecting the prerotation of the landing wheels through the periphery thereof.

These and other objects of the invention will appear more fully from the accompanying description and drawings and will be particularly pointed out in the claims.

Since the invention is not particularly concerned with the structure of the landing wheels, their supporting legs or struts, the positions in the aircraft where they are mounted, the means employed for moving the landing wheels between retracted and landing positions, it is only necessary here to illustrate and describe so much of certain types of landing wheel construction as is sufficient to disclose the nature and scope of the present invention.

In the drawings

Fig. 1 is a side elevation, partially diagrammatic, of a landing wheel construction comprising a strut having a pair of landing wheels with the strut pivoted at its upper end to allow the movement of the landing wheels between a retracted position with the strut substantially horizontal and a landing position with the strut substantially vertical, the former position being shown in full lines and the latter in dotted lines.

Fig. 2 is a top plan view of the main features of the construction shown in Fig. 1.

Fig. 3 is a front elevation of another form of construction embodying the invention of which the landing wheel and its leg or strut is pivotally mounted to move laterally between retracted positions within the wings of the aircraft and landing position.

Fig. 4 is a front elevation of an aircraft showing a pair of landing wheels mounted so as to move as illustrated in Fig. 3.

Fig. 5 is an underneath plan view of the construction shown in Fig. 3.

Referring first to the construction illustrated in Figs. 1 and 2, the leg or strut 1, 2 is of the usual type in which the part 2, telescoped within the part 1, is yieldingly pressed outwardly and in which the strut is pivoted at a shaft 3 in a suitable position in the aircraft. At the outer end of part 2 of the strut are journaled a pair of landing wheels 4 with the usual anti-shimmy hinge construction consisting of the links 5 pivoted together with one pivotally connected to the lower end of the strut part 2 and the other pivotally connected to the collar 6 on the strut part 1. Suitable means including the connection 7 are provided under the control of the pilot for swinging this landing wheel construction between retracted and landing positions. All of this construction thus far indicated is well known and familiar and may be of any suitable type.

In connection with this construction two landing wheel peripheral engaging prerotation driving means are disclosed. A frame 8 is located opposite the landing wheels in the retracted position and pivoted at 9 to a suitable support on the aircraft. Pulleys 11 are journaled on the pivotal axis of this frame and pulleys 12 on an axis near the upper end of the frame. A pair of endless driving belts 13 surround the pulleys 11 and 12 and are pressed into frictional engagement with the respective landing wheels 4 in the retracted position by suitable means such, for example, as the flexible connector 14 connected to the upper end of the frame 8 extending around the pulley 15 mounted on the fixed support 16 and yieldingly drawn taut by the spring 17. The endless belts are shown as driven by a belt 18 running over a pulley 19 on the pivotal shaft 9 carrying the pulleys 11 and over a pulley 20 on an electric motor 21 controlled by connections 22 extending to the pilot's position. This motor is of the variable speed type adapted to drive the endless belts 13 slowly at first and then with accelerated speed until the desired speed of prerotation of the landing wheels is secured. By reason of the fact that the driving belts engage the peripheries of the landing wheels, the power to effect prerotation is applied in the most effective manner. It will be seen also that the parts are so positioned that when the landing wheel construction is swung up to retracted position, shown in full lines, the peripheries of the wheels are brought into engagement with the endless driving belts and these belts are pressed firmly against the landing wheels so that the pilot when preparing to land, by operating the motor immediately effects the prerotation of the landing wheels.

In the construction illustrated in these figures, there is additionally provided a second peripheral driving means for the landing wheels so arranged as to continue to rotate the landing wheels until in landing position the landing wheels have actually engaged the ground. In this construction a frame 23 is pivoted by the shaft 24 to a collar 25 on the strut part 1. A second shaft 26 is mounted at the opposite end of the frame. The shaft 24 has secured to it a pair of pulleys, and another set of pulleys are journaled on the shaft 26. A pair of endless belts 27 surround these pulleys and engage respectively the peripheries of the landing wheels 4. They are pressed yieldingly into frictional engagement with the landing wheels by a link construction 28 pivoted at 29 to the frame 23 and at 30 to the lower end of the outwardly spring pressed strut part 2. These endless belts 27 are shown as driven by a flexible shaft 31 carrying at one end a bevel pinion 32 engaging a bevel pinion 33 on the shaft 24 and connected at the other end to an electric motor 34 synchronously controlled from the pilot's position and of the same type (or provided with a variable transmission) as in the case of the motor 21 to effect an accelerated inertia overcoming prerotation of the landing wheels.

This latter driving means, it will be seen from its construction, moves back and forth with the landing wheels between retracted and landing positions and thus under the control of the pilot may continue to rotate the landing wheels after they have left engagement with the driving belts 13. But when the aircraft lands, the weight of the aircraft causes the strut part 2 to telescope in the strut part 1, and thus through the link 28 the frame 23 with its driving belts is swung upward as indicated in Fig. 1, thus disconnecting the drive.

In the case of either driving means suitable means may be employed for indicating to the pilot at all times the peripheral speed of the landing wheels so that he may determine and control the peripheral speed of the landing wheels as required by the ground speed of the aircraft. As one such means a speedometer connection 35 is shown driven by the flexible shaft 31 with wire connections 36 extending to the pilot's position.

Another embodiment of the invention is illustrated in Figs. 3, 4 and 5 in connection with that type of landing wheel construction in which the landing wheel is mounted to swing on an axis extending fore and aft of the aircraft between its retracted and its landing position and in which it is mounted in the wing. In this form the landing wheel 90 is shown as of the single type. The landing wheel is pivoted on an axle 92 supported from the strut member 93 telescoped as before in the strut member 94 and the strut member 93 is pivoted on the shaft 95 extending fore and aft of the aircraft. The driving means, here illustrated as having frictional engagement with the periphery of the wheel when in retracted position, is of the endless belt type and the construction is such that when the landing wheel is swung to retracted position, it acts to press the driving belt firmly against its periphery. For that purpose a frame 100 is pivotally mounted at 101 and provided with an arm 102 extending opposite the axle or axle support of the landing wheel when in retracted position. This frame is provided with parallel transverse shafts 103 and 104 carrying pulleys for the endless driving belt 105. The lower shaft 103 is provided with a pulley 106 and is driven by a belt 107 extending to a motor, or driving means, 108 of the type operating on the principles previously described. A spring 110 between the arm 102 and the fixed part of the aircraft tends to swing the frame carrying the driving belt a slight distance clockwise. A small pulley 111, carried by the frame 100, engages the belt 107 and acts to maintain the belt taut. This movement of the frame thus relieves the pressure against the landing wheels of the driving means when the landing wheels are lowered toward landing position so as not to hinder the lowering action.

It will be seen that when the landing wheel has been moved away from retracted position, that the frame carrying the driving belt will be swung by the spring 110 to a position such as indicated in dotted lines in Fig. 3 and when the landing wheel is swung up to its retracted position, it engages the arm 102 and thus swings the frame in the opposite direction and forces the driving belt 105 firmly against the periphery of the wheel.

The operation of the various embodiments of the invention will be apparent from the foregoing description and all involve the same broad principles. The controls are assumed to be with the pilot, but may, of course, be located at any suitable position in the aircraft and under the management of any designated operator. In this position are the usual dials and other devices. The speedometer dials indicate the peripheral speed of the landing wheels and other dials or instrumentalities indicate or enable the calculation of the ground speed of the aircraft when landing. The ultimate means for operating the driving means, as the belts or conical disks for frictionally engaging the peripheries of the landing wheels, may be of any desired character, mechanical, electrical or otherwise and the electric motors shown are merely illustrative. So, also, the variable speed feature may be obtained as pointed out directly through the construction of the motor or by an intermediate transmission mechanism.

With this invention the pilot, or other operative, when preparing to land and while the landing wheels are in the retracted position, starts the driving means into operation through the controls, thus, by reason of the principles employed readily overcoming the inertia of the driving wheels to rotation and through the application of the power to the peripheries where it is most efficiently employed readily effects a pre-rotation of the landing wheels at the required speed which would usually be determined so as to synchronize with the predicted ground speed of the aircraft at landing. In the construction shown the required prerotation of the landing wheels is effected while in retracted position and the peripheral speed thus obtained may be maintained or little changed as the landing wheels reach landing position. But if a still more accurate control of the peripheral speed be desired, the principle employed in the construction illustrated in Figs. 1 and 2 may be utilized and the peripheral speed thus accurately controlled up to the impact of landing. In such case, of course, the controls would be manipulated to secure a synchronization of the speed of the two sets of driving belts when the landing wheels are in retracted position. And it is, of course, understood that in all cases it will be desirable through the controls to stop the operation of the driving means when the landing wheel leaves the retracted position or when the landing wheel reaches landing position.

In the event that the landing wheel construction is of a non-retractable type, it is obvious that the principle of the invention may be applied by the use, for example, of that portion of the construction shown in Figs. 1 and 2 where the wheel periphery engaging driving means are mounted upon the support for the wheels.

The landing wheels will preferably be provided with the usual braking means under the control of the pilot or operative so that if the peripheral speed of the landing wheels exceeds that desirable in relation to the ground speed of the aircraft when landing, the speed of the wheels may be reduced by the braking means.

While in the construction illustrated in Fig. 1, the motor and speedometer mechanism employed in connection with the driving means which moves bodily with the landing wheels between retracted and landing position are shown in fixed position on the aircraft with the flexible drive extending to the driving means, it is obvious that the fixed position of these elements is but illustrative and that they may be mounted and moved with landing wheels.

Throughout the development of this invention the importance and necessity has been recognized that nothing be placed in contact with, or adjacent to, the landing wheels and other parts of the landing gear which could, through mechanical failure or motive-power failure, prevent or hinder the operation of lowering of said landing gear into the required position for landing of the aircraft.

Because of this consideration it will be noted that the various prerotation means, have been purposely designed to be so located in such manner and at such angles of contact to the peripheries of the landing wheels and in such positions that should there be mechanical breakdown of or motive-power failure to the several prerotation means the wheels of the landing gear would easily roll out of contact with said prerotation means when they were caused to be lowered into landing position by means separate from and independent of any mechanism of the prerotation means.

Also in types where provision has been made for auxiliary prerotation means attached to landing gear and movable therewith, provision has also been made so that in the event that these means are inoperative for any reason, they will be automatically and instantly disengaged from contact with the landing wheels at the moment of the contact between the lowered landing wheels and surface on which the aircraft is landing.

Having thus described the invention, what is claimed as new, and desired to be secured by Letters Patent, is:

1. The combination with an aircraft having a landing wheel mounted thereon for movement between a retracted position and the landing position, of two sets of driving means frictionally engageable with the wheel periphery when the wheel is in retracted position, means for operating both driving means in synchronism to effect prerotation of the wheel preparatory to landing, one set of said driving means being mounted for movement in frictional engagement with the wheel from retracted position to landing position.

2. The combination with an aircraft having a landing wheel provided with a rubber tire and movable between a retracted position and the landing position, of driving means comprising an endless belt contacting the outer peripheral segment of the tire tangential thereto when the wheel is in retracted position, and means for operating the endless belt to effect prerotation of the wheel preparatory to landing.

3. The construction defined in claim 2 together with means acting to move the driving means bodily toward the landing wheel when in retracted position thus acting upon movement of the landing wheel into retracted position to cause the endless belt to press into firmer frictional engagement with the wheel periphery.

4. The combination with an aircraft having a landing wheel provided with a rubber tire, of driving means comprising an endless belt contacting the outer peripheral segment of the tire tangentially thereto, and means for operating the endless belt to effect prerotation of the wheel preparatory to landing.

5. The combination with an aircraft of a supporting strut part movably mounted thereon, a second strut part telescoping with the first, a landing wheel provided with a rubber tire pivoted on the lower end of the second strut part, means for moving the strut parts to carry the wheel between a retracted position and the landing position, driving means frictionally engageable with the outer peripheral segment of the tire tangentially thereto and movable in such engagement with the tire from retracted position to landing position, means for operating the driving means when in retracted position and during the movement thereof from said retracted position to landing position, a connection between the second strut part and the driving means acting to move the driving means out of engagement with the wheel by the telescoping movement of the second strut part upon landing impact.

6. The construction defined in claim 5 in which the driving means is pivotally mounted on the first strut part and in which the connection consists of a link connecting the second strut part to the driving means.

7. The construction defined in claim 1 together with a telescoping strut movably connected to the aircraft, means for mounting the landing wheel upon the lower portion of the strut, means for mounting that driving means which is in frictional engagement and movable with the landing wheel upon the upper portion of the strut, and a connection between the lower portion of the strut and the driving means acting to move the said driving means bodily away from engagement with the landing wheel by the telescoping action of the strut upon landing impact of the wheel.

8. The combination with an aircraft having a landing wheel and movable between a retracted position and the landing position, of driving means comprising an endless belt contacting the outer peripheral segment of the wheel tangential thereto when the wheel is in retracted position, and means for operating the endless belt to effect prerotation of the wheel preparatory to landing.

9. The construction defined in claim 8, together with means acting to move the driving means bodily toward the landing wheel when in retracted position, thus acting upon movement of the landing wheel into retracted position to cause the endless belt to press into firmer frictional engagement with the wheel periphery.

10. The combination with an aircraft of a supporting strut part movably mounted thereon, a second strut part telescoping with the first, a landing wheel pivoted on the lower end of the second strut part, means for moving the strut parts to carry the wheel between a retracted position and the landing position, driving means frictionally engageable with the outer peripheral segment of the wheel tangentially thereto and movable in such engagement with the wheel from retracted position to landing position, means for operating the driving means when in retracted position and during the movement thereof from said retracted position to landing position, a connection between the second strut part and the driving means acting to move the driving means out of engagement with the wheel by the telescoping movement of the second strut part upon landing impact.

MALCOLM WILCOX MORSE.

REFERENCES CITED

The following references are of record in the file of this patent:

UNITED STATES PATENTS

| Number | Name | Date |
|---|---|---|
| 1,834,427 | Schumacher | Dec. 1, 1931 |
| 2,063,032 | Fator | Dec. 8, 1936 |
| 2,264,923 | Waseige | Dec. 2, 1941 |
| 2,305,237 | Carpenter | Dec. 15, 1942 |
| 2,320,547 | Tiger | June 1, 1943 |
| 2,347,986 | Powerman | May 2, 1944 |
| 2,370,316 | Juul | Feb. 27, 1945 |
| 2,389,525 | Manheim | Nov. 20, 1945 |
| 2,399,218 | Feldburg | Apr. 30, 1946 |
| 2,408,870 | Murdoch | Oct. 8, 1946 |
| 2,417,937 | Knox | Mar. 25, 1947 |

FOREIGN PATENTS

| Number | Country | Date |
|---|---|---|
| 678,786 | France | Jan. 2, 1930 |